(12) United States Patent
Lavastre et al.

(10) Patent No.: US 7,930,589 B2
(45) Date of Patent: Apr. 19, 2011

(54) INTERRUPT-RESPONSIVE NON-VOLATILE MEMORY SYSTEM AND METHOD

(75) Inventors: Stéphane Lavastre, Moirans (FR); Kiernan Heffernan, Patrickswell (IE); Patrick Crowe, Dooradoyle (IE)

(73) Assignee: Analog Devices, Inc., Norwood, MA (US)

( * ) Notice: Subject to any disclaimer, the term of this patent is extended or adjusted under 35 U.S.C. 154(b) by 0 days.

(21) Appl. No.: 11/452,777

(22) Filed: Jun. 14, 2006

(65) Prior Publication Data

US 2007/0028141 A1 Feb. 1, 2007

Related U.S. Application Data

(60) Provisional application No. 60/691,479, filed on Jun. 17, 2005.

(51) Int. Cl.
*G06F 11/00* (2006.01)
(52) U.S. Cl. ........ 714/23; 711/103; 714/15; 365/185.33
(58) Field of Classification Search .................. 711/103; 714/15, 23; 365/185.33
See application file for complete search history.

(56) References Cited

U.S. PATENT DOCUMENTS

| 4,719,565 A | 1/1988 | Moller |
| 5,293,591 A | 3/1994 | Dettmer |
| 5,761,690 A | 6/1998 | Dao et al. |
| 6,125,309 A * | 9/2000 | Fujimoto ........................ 701/1 |
| 6,243,789 B1 | 6/2001 | Hasbun et al. |
| 7,089,449 B1 * | 8/2006 | Cluff et al. ..................... 714/15 |
| 7,116,579 B2 * | 10/2006 | Morikawa et al. ........ 365/185.14 |
| 7,133,961 B2 * | 11/2006 | Katayama et al. ............ 711/103 |
| 2003/0018842 A1 | 1/2003 | Harbin |
| 2004/0003167 A1 * | 1/2004 | Kimura et al. ................ 711/103 |
| 2004/0111572 A1 | 6/2004 | Arimilli et al. |
| 2005/0060461 A1 | 3/2005 | Yang |

FOREIGN PATENT DOCUMENTS

EP 1 209 570 A2 5/2002

OTHER PUBLICATIONS

Supplementary European Search Report dated Aug. 4, 2010, in counterpart European application No. EP06773308.9.
International Search Report dated Apr. 25, 2007, in counterpart International application No. PCT/US2006/023420.

* cited by examiner

*Primary Examiner* — Jasmine Song
(74) *Attorney, Agent, or Firm* — Kenyon & Kenyon LLP

(57) ABSTRACT

An interrupt-responsive non-volatile memory respond to an interrupt by aborting execution by a memory controller of a memory routine in a non-volatile memory, sets, a flag and executes an interrupt service routine; and upon completion of the interrupt service routine, in response to the flag, recovers the execution of the aborted memory routine.

17 Claims, 5 Drawing Sheets

INTERRUPT-RESPONSIVE NON-VOLATILE MEMORY SYSTEM AND METHOD

RELATED APPLICATIONS

This application claims benefit of and priority to U.S. Provisional Application Ser. No. 60/691,479 filed Jun. 17, 2005 incorporated herein by this reference.

FIELD OF THE INVENTION

This invention relates to an improved interrupt-responsive non-volatile memory system and method and more particularly to such a system and method which responds to interrupts quickly even using only one memory.

BACKGROUND OF THE INVENTION

Programming and erase time in a non-volatile, e.g. flash memory can be time consuming. It can typically take 50 us for a location to be programmed while erase of a page of flash memory can take 20 ms. Such program/erase operations will also "lock out" the entire flash memory preventing access to all memory locations. In typical real time embedded applications, such as those in automotive sensors, there is the requirement to service interrupts from sources such as an analog-to-digital converter (ADC) or communications interface such as the LIN bus. The problem arises when such an interrupt arrives during a flash program or erase cycle and the interrupt service routine resides in another part of the flash memory being programmed or erased. The interrupt may be queued for servicing after the flash operation, however this may result in an unacceptable delay in the response to the interrupt. Furthermore, if there are multiple interrupts occurring during the flash operation, some may be ignored and lost. It is possible to reside the time critical interrupt service routines in a separate memory that won't be locked out by program/erase of the main memory. For example this second memory could be another non-volatile memory or a portion of the system SRAM. Provision of a second non-volatile memory is expensive in die area and the user would also be required to manage placement of code in the two memories. SRAM cell sizes are typically up to 10 times larger than a flash memory cell and consequently not an efficient solution, particularly for large interrupt service routines. It also requires careful management of code placement and makes the software programming more difficult.

SUMMARY OF THE INVENTION

It is therefore an object of this invention to provide an improved interrupt-responsive non-volatile memory system and method.

It is a further object of this invention to provide such an improved interrupt-responsive non-volatile memory system and method which allows real time interrupt servicing.

It is a further object of this invention to provide such an improved interrupt-responsive non-volatile memory system and method which prevents loss and delay in servicing interrupts.

It is a further object of this invention to provide such an improved interrupt-responsive non-volatile memory system and method which is even applicable using but one non-volatile memory.

It is a further object of this invention to provide such an improved interrupt-responsive non-volatile memory system and method which is smaller, requires less power and provides faster interrupt servicing even using only one memory.

It is a further object of this invention to provide such an improved interrupt-responsive non-volatile memory system and method which enables easier software development than the two memory solution.

The invention results from the realization that a smaller, lower cost, lower power non-volatile memory system and method which responds quickly to interrupts can be achieved by aborting, in response to an interrupt, execution by a memory controller of a memory routine in a non-volatile memory, setting a command failed flag and executing an interrupt service routine and upon completion of said interrupt service routine, in response to the command failed flag, recovering the execution of the aborted memory routine.

The subject invention, however, in other embodiments, need not achieve all these objectives and the claims hereof should not be limited to structures or methods capable of achieving these objectives.

This invention features an interrupt-responsive non-volatile memory system including a non-volatile memory array and a processor. There is a memory controller responsive to a command from the processor to executive a memory routine and responsive to an interrupt to abort execution of the memory routine, set a flag, and execute an interrupt routine. The processor is responsive to the flag for recovering executive of the aborted memory routine upon completion of the interrupt routine.

In a preferred embodiment the non-volatile memory array may include a single memory. The non-volatile memory array may include a flash memory. The memory controller may be directly responsive to an interrupt to abort execution of a memory routine. The processor may provide an abort signal to the memory controller in response to an interrupt. The memory controller may include a status register for setting the flag. The processor may recover the aborted memory routine by repeating it.

The invention also features an interrupt-responsive non-volatile memory method including in response to an interrupt, aborting execution via memory controller of a memory routine in a non-volatile memory, setting a flag and executing an interrupt service routine. Upon completion of the interrupt service routine, in response to the flag, the execution of the aborted memory routine is recovered.

In a preferred embodiment the aborting execution of the memory routines may occur directly in response to an interrupt at the memory controller or it may occur upon an abort signal derived from that interrupt e.g. from an external processor. Recovering the memory routine may include repeating it.

BRIEF DESCRIPTION OF THE DRAWINGS

Other objects, features and advantages will occur to those skilled in the art from the following description of a preferred embodiment and the accompanying drawings, in which.

DISCLOSURE OF THE PREFERRED EMBODIMENT

Figure 1:
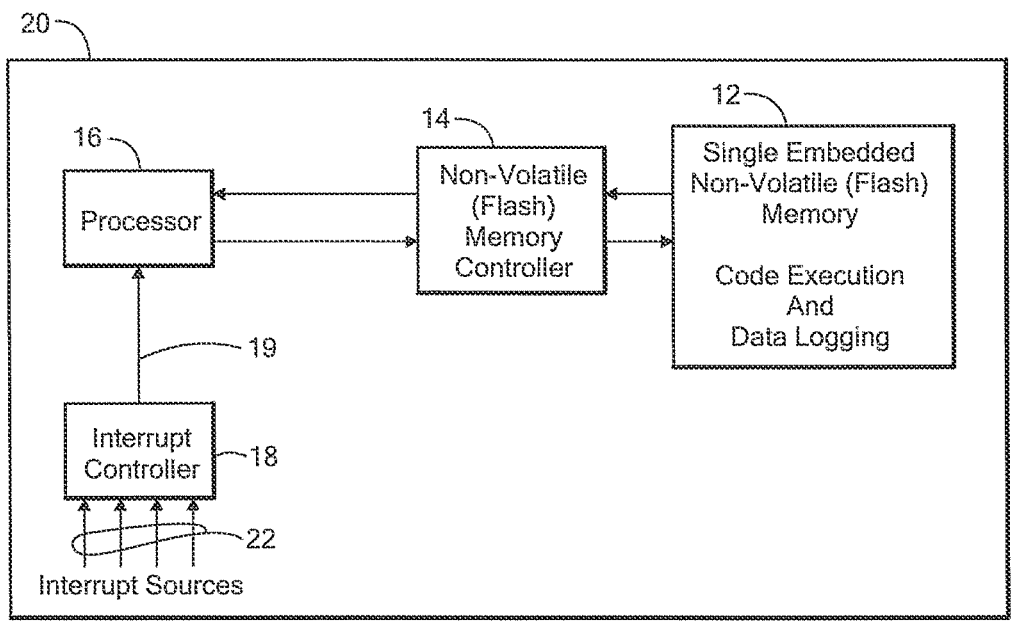
FIG. 1 is a schematic block diagram of a prior art non-volatile memory system.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

There is shown in FIG. 1 a prior art non-volatile memory system 10 including a single embedded non-volatile, for example flash, memory 12, flash memory controller 14, processor 16 and interrupt controller 18 all of which may be carried on a single chip 20.

In operation processor 16 sends a command to memory controller 14 which then executes a memory routine for memory 12. Memory 12 is a code execution and data logging memory. The memory routine being executed may, for example, be a program erase routine which may take, for example, 20 ms to complete. Upon completion of that memory routine, memory controller 14 sends a memory interrupt back to processor 16 which then moves to issue the next command. If during that program/erase memory routine execution an external interrupt from any one of a number of different sources 22 arrives through processor 16 on line 66 at interrupt controller 18, that interrupt is forwarded on line 19 to processor 16. Processor 16 now seeks to process as quickly as possible this interrupt which by its nature has a certain urgency associated with it. However, because the program/erase memory routine is being carried out, processor 16 must delay its response to the external interrupt from interrupt controller 18. If the program/erase memory routine is nearing completion it may be completed in time for processor 16 to service the interrupt from interrupt controller 18 before it is either lost or the response becomes unuseful.

Figure 2:
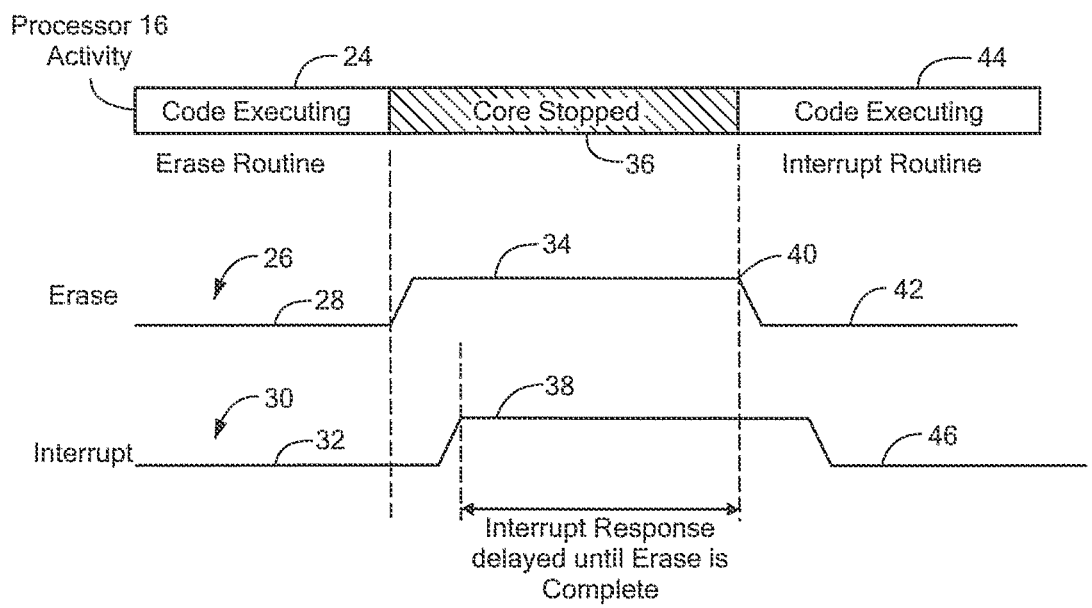
FIG. 2 is an illustration of the timing of the servicing of an interrupt by the system of FIG. 1.

Typically a read from memory instruction from a non-volatile memory requires one core cycle or approximately 15 nsec; an erase from memory, on the other hand, takes approximately 20 msec. A write to the memory takes approximately 30 μsec to set up and is accomplished at a rate of about 20 μsec per bit. Processor 16 has to wait until the memory instructions have been executed; any interruptions that happen in this time have to wait until those instructions are completed. However, interrupt response time is typically specified in hundredths of nano seconds; therefore a write/erase instruction to the memory may cause the interrupt response time requirement to be exceeded. In operation when processor 16 sends a command to memory controller 14 to be executed in memory 12, upon completion of that memory routine or the failure thereof, a flag is set in memory controller 14, e.g. a command complete flag or a command failed flag. Subsequently, processor 16 upon seeing one of those flags acts accordingly. If the command complete flag is set processor 16 moves on to the next operation. If the command fail flag is set, it typically repeats the last command. Processor 16 may strobe or query the flags. For example, in a status register in controller 14 processor 16 on its own initiative may strobe or query the flags in controller 14 which may for example be in a status register. Or controller 14 may send a memory interrupt indicating that the command has been completed or failed sends a memory interrupt at which point processor 16 then strobes or queries the status register. The timing of the operation of system 10 is shown in FIG. 2. Initially in FIG. 2 processor 16 activity involves executing code as shown in 24. During this time an erase 26 (e.g. flash erase) is low as at 28 and the interrupt signal 30 is also low as at 32. When the erase command is received erase goes high, 34, and a core execution is stopped, 36. An interrupt that occurs now, shown by interrupt 30 going high 38, must simply wait until the erase is complete. When the erase is complete at 40, erase goes low as at 42 and the code begins executing again at 44. Interrupt 30 can now be serviced: when it is done, it once again returns to a low state 46.

Figure 3:
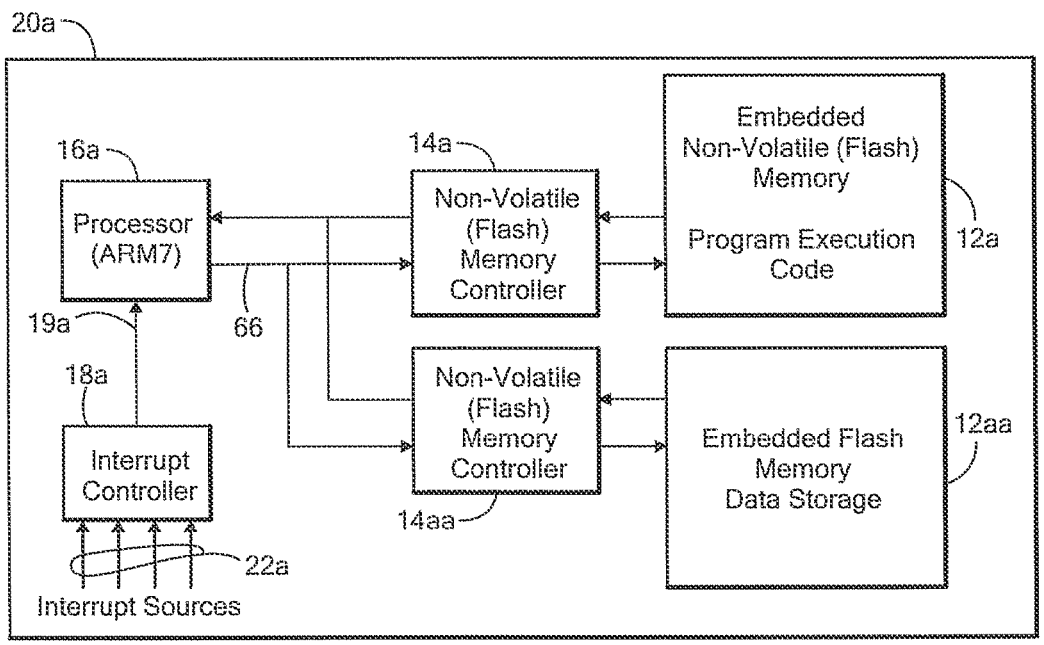
FIG. 3 is a schematic block diagram of another prior art non-volatile memory system using two memories.

One prior art approach to this problem system 10a, FIG. 3, uses two memories 12a, 12aa with two independent memory controllers, 14a, 14aa. One of the memories 12a is a program execution code memory while the other memory 12aa is a data storage memory. While one memory 12a is available for execution all the time, the second block is used for data logging. In addition to requiring twice the number of memories using more chip real estate, more power, more size and more complex programming as well as an additional controller, this approach only partially solves the problem. If an external interrupt 22a is seeking a program execution from memory 12a while memory 12aa is undergoing an erase operation there is an advantage. However, if the external interrupt 22a seeks data from data storage 12aa while an erase operation is going on in data storage 12aa the response to that interrupt will be delayed until the erase operation in memory 12aa is complete.

Figure 4:
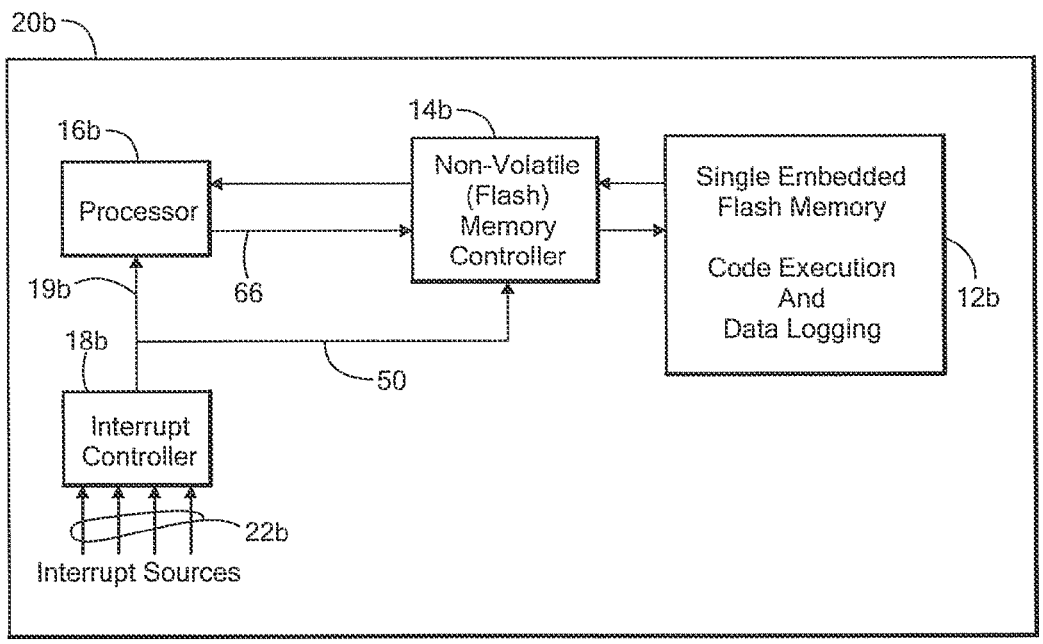
FIG. 4 is a schematic block diagram of a non-volatile memory system according to this invention.

In accordance with this invention, interrupt responsive-non volatile memory system 10b, FIG. 4, can operate with only a single embedded flash memory, although more could be used. With this invention upon receipt of an external interrupt 22b interrupt controller 18b sends the interrupt signal, not just on line 19b to processor 16b, but also on line 50 to controller 14b. In addition to the interrupt being dispatched on line 19b to processor 16b that interrupt is also delivered on line 50 to memory controller 14b. Here it accomplishes two things: it sets a flag, e.g. command failed, and it aborts the memory routine presently executing. With the memory core no longer stopped, processor 16b may now immediately begin a service routine for the interrupt on lines 19b and 50. At the completion of this command memory controller 14b sends a memory interrupt back to processor 16b. When processor 16b interrogates controller 14b it finds the command failed flag set. And thus it immediately vectors to recover the last command. The aborted command can be recovered in any way desirable. For example, the system as stated previously, can simply vector to repeat the last command and this is the preferred command. As indicated previously with respect to FIG. 1 processor 16b may on its own initiative seek the command failed flag without first receiving a memory interrupt from controller 14b.

Figure 5:
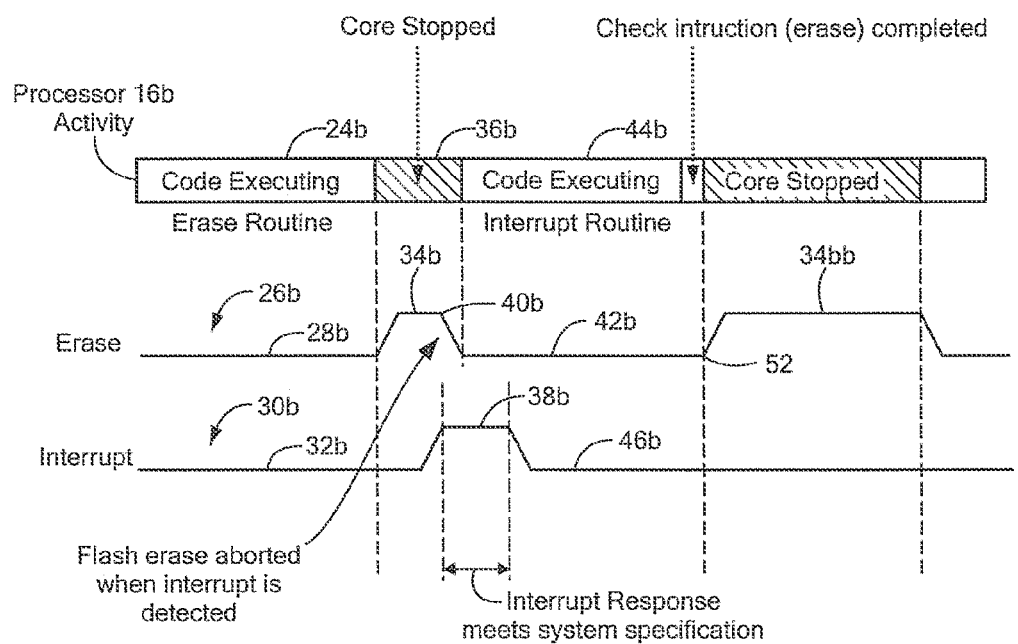
FIG. 5 is an illustration of the timing of the servicing of an interrupt by the system of FIG. 4.

The timing of the operation of system 10b according to this invention is shown in FIG. 5, where initially during code executing 24b, flash erase 26b is low as at 28b and interrupt 30b is low at 32b just as previously shown in prior art FIG. 2. Also similarly to prior art operation depicted in FIG. 2, the core is stopped 36bb when flash/erase is high at 34b, but when interrupt 38b arrives in accordance with this invention, flash/erase stops at 40b and reverts to the low level 42b while now in response to the interrupt, the interrupt routine is executed

44b. When the interrupt routine execution is complete as at 52 the original erase routine is resumed or repeated 34bb.

Figure 6:
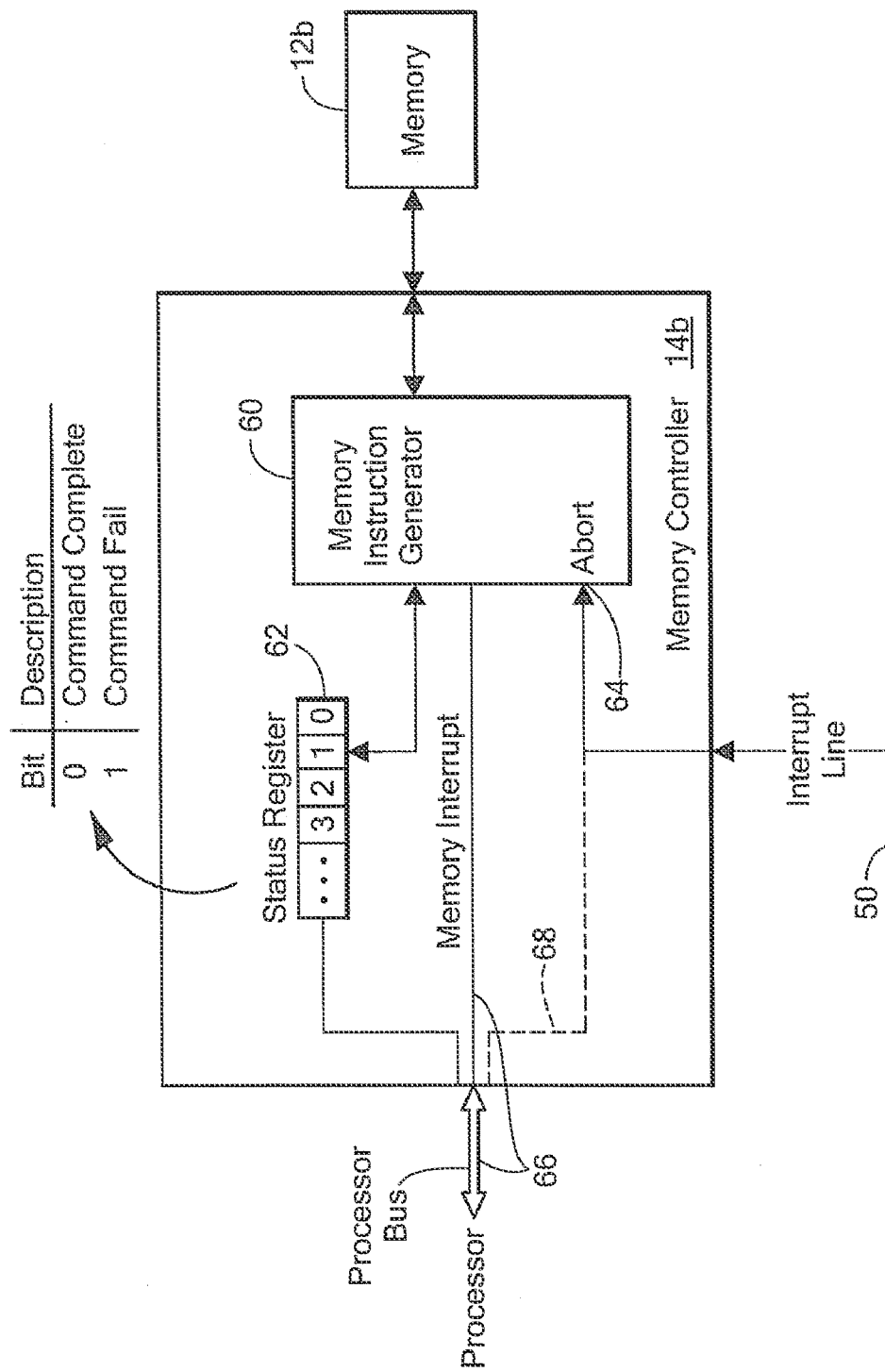
FIG. 6 is a more detailed schematic block diagram of the memory controller of FIG. 4.

Memory controller 14b, FIG. 6, may include, among other things, a memory instruction generator 60 and a status register 62. In operation, when an interrupt occurs on line 50 it may go directly to the abort input 64 of memory instruction generator 60 which causes it to abort the memory routine execution making itself available to execute commands from processor 16b. As soon as memory instruction generator 60 receives an interrupt at abort port 64, it also sets a one in status register 62 indicating command failed and begins performing the interrupt routine with memory 12b. When the interrupt routine is complete it sends a memory interrupt back to processor 16b which then responds by strobing status register 62 to find the command failed flag set. In response to this processor 16b will immediately resume the previous command to recover it in some way either by beginning it again or for example by repeating it entirely. Alternatively, as explained before with respect to the prior art, processor 16b could itself be monitoring status register 62 without the need for the memory interrupt prompt on line 66. Although in FIG. 6 memory instruction generator 60 responds directly to the interrupt on line 50 appearing at its abort port 64, this is not a necessary limitation of the invention. For example, the interrupt to the processor could immediately generate an abort signal such as on line 68 which would be delivered directly to the abort port 64 in which case the interrupt from line 50 would not be needed.

Figure 7:
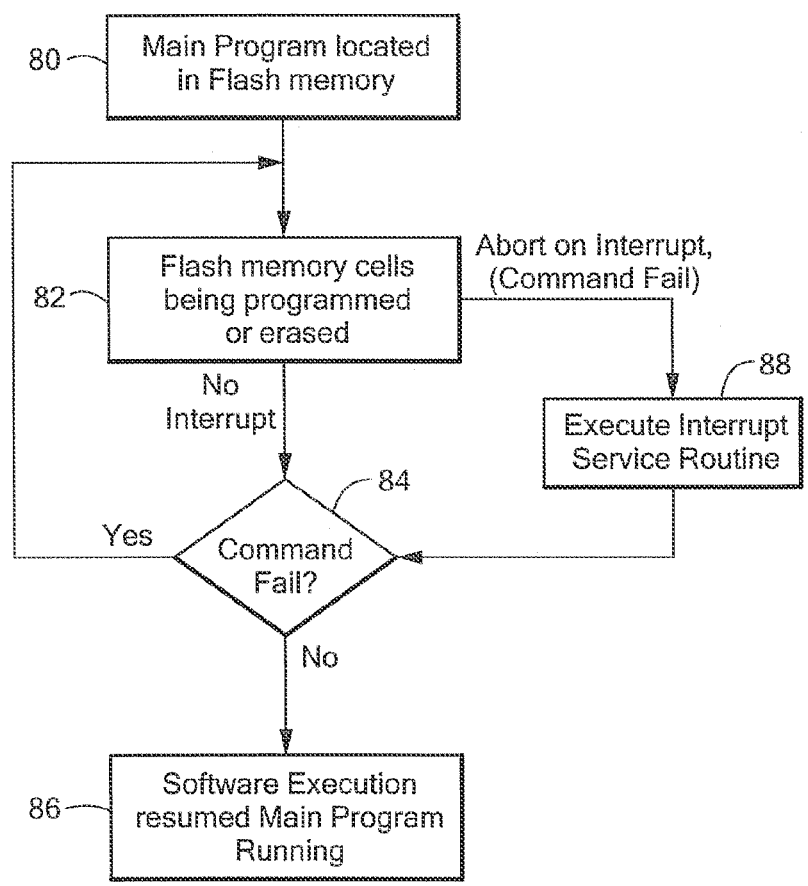
FIG. 7 is a software diagram of the basic execution flow according to the method of this invention.

Although thus far the invention has been described in terms of a apparatus or system the invention contemplates any method of responding to an interrupt by aborting execution by a memory to an interrupt (19b), aborting execution by a memory controller (16b) of a memory routine in a non-volatile memory (12b), setting a (command failed) flag and executing an interrupt service routine. And further upon completion of the interrupt service routine, in response to the command failed flag the method contemplates recovering the execution of the aborted memory routine. One embodiment is depicted in the diagram of FIG. 7. The main program located in (flash) memory is executed, 80, where the (flash) memory cells may be programmed or erased 82. If there has been no interrupt then after the program or erase operation 82, inquiry is made as to whether the command failed 84. If the answer is no, then the software execution is resumed and the main program continues to run, 86. If the command did fail the system is returned to the last command operation 82. If an interrupt occurs, an abort is initiated and the interrupt service routine is executed 88. At the completion of the interrupt service routine the question: Has the command failed? is also asked. If an executed interrupt service routine has been accomplished, the (command failed) flag would have been set and so the answer this time is yes and the system now returns to 82 to recover the command that was aborted.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

Other embodiments will occur to those skilled in the art and are within the following claims.

What is claimed is:

1. Interrupt-responsive non-volatile memory system comprising:
   a non-volatile memory array;
   a processor; and
   a memory controller responsive to a command from said processor to execute a memory routine, wherein, in response to an interrupt,
   the memory controller is to:
      set a flag in the memory controller indicating that execution of the memory routine has failed,
      abort the execution of said memory routine, the processor is to:
      execute an interrupt service routine,
      after completion of the interrupt service routine, interrogate the memory controller to determine whether the flag has been set, and
      when the flag is set, repeat the command to the memory controller to execute the memory routine entirely.

2. The non-volatile memory system of claim 1 in which said non-volatile memory array includes a single memory.

3. The non-volatile memory system of claim 1 in which said non-volatile memory array includes a flash memory.

4. The non-volatile memory system of claim 1 in which said memory controller is directly responsive to an interrupt to abort execution of a memory routine.

5. The non-volatile memory system of claim 1 in which said processor provides an abort signal to said memory controller in response to an interrupt.

6. The non-volatile memory system of claim 1 in which said memory controller includes a status register for setting said flag.

7. The non-volatile memory system of claim 1, wherein execution of the interrupt service routine includes execution of a second memory routine.

8. The non-volatile memory system of claim 7, wherein execution of the second memory routine includes writing to the non-volatile memory array.

9. The non-volatile memory system of claim 7, wherein execution of the second memory routine includes reading from the non-volatile memory array.

10. The non-volatile memory system of claim 7, wherein execution of the second memory routine includes erasing the non-volatile memory array.

11. An interrupt-responsive non-volatile memory method comprising:
    receiving a command, by a memory controller from a processor, to execute a memory routine in a non-volatile memory;
    in response to an interrupt, causing the memory controller to abort the memory routine;
    setting, by the memory controller, a flag indicating the memory routine being failed;
    executing, by the processor, an interrupt service routine;
    upon completion of said interrupt service routine, interrogating the memory controller, by the processor, to determine whether the flag has been set, and when the flag is set, repeating, by the processor, the command to the memory controller to execute said memory routine entirely.

12. The non-volatile memory method for claim 11 in which said aborting execution of the memory routine occurs directly in response to an interrupt at the memory controller.

13. The non-volatile memory method for claim 11 in which said aborting execution of the memory routine occurs directly in response to an abort signal derived from the interrupt.

14. The non-volatile memory method of claim 11, wherein execution of the interrupt service routine includes execution of a second memory routine.

15. The non-volatile memory method of claim 14, wherein execution of the second memory routine includes writing to the non-volatile memory array.

16. The non-volatile memory method of claim 14, wherein execution of the second memory routine includes reading from the non-volatile memory array.

17. The non-volatile memory method of claim 14, wherein execution of the second memory routine includes erasing the non-volatile memory array.

* * * * *